United States Patent
Nakagawa et al.

(10) Patent No.: US 8,876,917 B2
(45) Date of Patent: Nov. 4, 2014

(54) LITHIUM-ION SECONDARY BATTERY

(75) Inventors: Yuta Nakagawa, Kyoto (JP); Masato Ueno, Kyoto (JP); Hiroshi Abe, Kyoto (JP); Hideki Tsuruga, Kyoto (JP); Yohei Hamaguchi, Obu (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 26 days.

(21) Appl. No.: 13/386,800

(22) PCT Filed: Feb. 28, 2011

(86) PCT No.: PCT/JP2011/054450
§ 371 (c)(1),
(2), (4) Date: Jan. 24, 2012

(87) PCT Pub. No.: WO2011/111556
PCT Pub. Date: Sep. 15, 2011

(65) Prior Publication Data
US 2012/0121968 A1 May 17, 2012

(30) Foreign Application Priority Data
Mar. 8, 2010 (JP) ................................. 2010-050744

(51) Int. Cl.
*H01M 10/00* (2006.01)
(Continued)

(52) U.S. Cl.
CPC ...... *H01M 10/0525* (2013.01); *H01M 10/0587* (2013.01); *H01M 2/26* (2013.01); *H01M 10/0409* (2013.01); *Y02E 60/122* (2013.01); *H01M 4/661* (2013.01); *H01M 2/026* (2013.01); *H01M 2004/027* (2013.01); *H01M 2/0207* (2013.01); *H01M 4/70* (2013.01)
USPC ........................................ 29/623.1; 29/623.2

(58) Field of Classification Search
CPC ....... H01M 2/0212; H01M 2/20; H01M 2/26; H01M 4/04; H01M 10/04
USPC .............. 429/1–11, 47–255; 29/623.1, 623.2, 29/623.3, 623.4, 623.5
See application file for complete search history.

(56) References Cited

U.S. PATENT DOCUMENTS

2006/0040181 A1 2/2006 Kim et al.
2006/0093922 A1* 5/2006 Kim et al. ..................... 429/251

(Continued)

FOREIGN PATENT DOCUMENTS

JP 60-188469 U 12/1985
JP 6-31461 A 2/1994

(Continued)

OTHER PUBLICATIONS

PCT/ISA/210—International Search Report dated May 10, 2011 for PCT/JP2011/054450.

(Continued)

*Primary Examiner* — Mark F Huff
*Assistant Examiner* — Omar Kekia
(74) *Attorney, Agent, or Firm* — Birch, Stewart, Kolasch & Birch, LLP (57) ABSTRACT

A lithium-ion secondary battery is provided where the production process line that fabricated it can be identified. The lithium-ion secondary battery includes a jelly roll, a positive electrode tab, a negative electrode tab, a positive electrode can, and a lid. The jelly roll is made by rolling the positive electrode and the negative electrode with an interposed separator, and is contained in the casing. The positive electrode tab has one end connected to the positive electrode of the jelly roll and the other end connected to the lid. The negative electrode tab has one end connected to the negative electrode of the jelly roll and the other end connected to a terminal provided on the lid. The other end of the negative electrode tab has a shape with a cut at a cut angle determined in accordance with the production process line that fabricated the lithium-ion secondary battery.

7 Claims, 9 Drawing Sheets

(51) Int. Cl.
  *H01M 10/0587* (2010.01)
  *H01M 2/26* (2006.01)
  *H01M 10/04* (2006.01)
  *H01M 10/0525* (2010.01)
  *H01M 4/70* (2006.01)
  *H01M 4/66* (2006.01)
  *H01M 2/02* (2006.01)
  *H01M 4/02* (2006.01)

(56) References Cited

U.S. PATENT DOCUMENTS

2007/0154801 A1* 7/2007 Hyung et al. .................. 429/180
2010/0028762 A1   2/2010 Yokoyama et al.

FOREIGN PATENT DOCUMENTS

| JP | 10-64525 A | 3/1998 |
| JP | 2000-90958 A | 3/2000 |
| JP | 2003-31186 A | 1/2003 |
| JP | 2004-241328 A | 8/2004 |
| JP | 2006-40875 A | 2/2006 |
| JP | 2006-164883 A | 6/2006 |
| JP | 2007-26844 A | 2/2007 |
| JP | 2007-335352 A | 12/2007 |
| JP | 2008-204686 A | 9/2008 |
| JP | 2010-33949 A | 2/2010 |

OTHER PUBLICATIONS

Japanese Office Action, dated Jun. 11, 2013, for Japanese Application No. 2011-542389 with an English translation.
Chinese Office Action, dated Nov. 21, 2013, for Chinese Application No. 201180002667.X.

* cited by examiner

LITHIUM-ION SECONDARY BATTERY

TECHNICAL FIELD

The present invention relates to lithium-ion secondary batteries.

BACKGROUND ART

Lithium-ion secondary batteries are known that include a jelly roll made by rolling a positive electrode and a negative electrode, composed mainly of materials that electro-chemically occlude and discharge lithium ions, with an interposed separator in between, or a stack made by stacking a positive electrode and a negative electrode with an interposed separator (both hereinafter referred to as "power generating element"), contained in a metal or laminated casing.

Such a power generating element includes a positive electrode tab and a negative electrode tab connected with the positive electrode and the negative electrode, respectively. If a typical lithium-ion secondary battery has a rectangular or cylindrical metal can for a casing, it generally includes a negative electrode tab and a positive electrode tab welded to the casing can or the lid that seals a casing can or the like. If the casing is made of a laminate of aluminum, for example, one end of each of the positive and negative electrode tabs can be electrically connected to the outside via the laminate, establishing electrical connection with an external terminal to allow electrical power to be exchanged.

In a conventional lithium-ion secondary battery, the power generating element is fabricated in multiple production steps using various assembly apparatus such as a tab welder, a rolling machine, a tab cutter, and other apparatus. Typically, to achieve mass production or for other purposes, the multiple production steps are performed by a single production line, where at least two production lines are concurrently operated to produce the desired number of batteries.

In the context of production management of lithium-ion secondary batteries, improved traceability of batteries is important. Particularly, the safety of a lithium-ion secondary battery often depends largely on the interior structure of the battery, such that it is very important to be able to determine which production line made a battery with a defect in order to deal with an emergency, for example.

Accordingly, methods have been proposed where a number or a figure is impressed on a tab or a current collector as an identifier that achieves traceability (Patent Document 1).

PRIOR ART

Patent Documents

Patent Document 1: JP2006-40875A

DISCLOSURE OF THE INVENTION

However, providing an identifier as disclosed in Patent Document 1 makes nondestructive identification of a battery difficult, making it necessary to break up the battery for identification. Moreover, a new step of providing an identifier is necessary, resulting in an increased number of production steps and an increased unit cost of a battery.

Since lithium-ion secondary batteries are tightly sealed, breaking up a battery is troublesome. Furthermore, an error in such work may cause a short circuit. Thus, there has been a need for a battery that permits nondestructive traceability, or, more preferably, a battery that permits traceability that can be made in a simple process and does not require higher costs.

The present invention was made to solve these problems. An object of the present invention is to provide a lithium-ion secondary battery that, when defected, enables identifying the production line that assembled the battery in a nondestructive manner.

According to the present invention, a lithium-ion secondary battery includes, at least, a power generating element and a casing. The power generating element has a positive electrode to which one end of a positive electrode tab is connected, and a negative electrode to which one end of a negative electrode tab is connected, with an interposed separator therebetween. The planar shape of the one end of the positive electrode tab and/or the negative electrode tab connected with the positive electrode and negative electrode, respectively, is an arc-like shape or a geometry having at least two angles.

Further, according to the present invention, a lithium-ion secondary battery includes, at least, a power generating element having a positive electrode to which one end of a positive electrode tab is connected, and a negative electrode to which one end of a negative electrode tab is connected, with an interposed separator, and a casing, and is fabricated by one of a plurality of production process lines each including a plurality of production steps, where the power generating element is fabricated by the step of cutting the positive electrode tab and the negative electrode tab, the step of connecting the positive electrode tab and the negative electrode tab with the positive electrode and the negative electrode, respectively, and the step of disposing the positive electrode and the negative electrode with an interposed separator, and the plurality of production process lines include at least two production process lines, each including, at least, the step of fabricating a power generating element. The one end of at least one of the positive electrode tab and the negative electrode tab connected with the positive electrode and the negative electrode, respectively, has a planar shape varying in accordance with each of the production process lines.

According to an embodiment of the present invention, in a lithium-ion secondary battery, the one end of at least one of the positive electrode tab and the negative electrode tab has a planar shape of an arc or a geometry having at least two angles, and these planar shapes are determined so as to correspond to different productions process lines that assemble batteries. Specifically, the planar shape of the one end of a tab in a lithium-ion secondary battery manufactured by one production process line (for example, the first production process line) is different from the planar shape of the one end of a tab in a lithium-ion secondary battery manufactured by another production process line (for example, the second production process line).

After a lithium-ion secondary battery is completed by a production process line, it may be tested in a nondestructive manner using an X-ray inspection apparatus. If a defect in the arrangement of the positive electrode and the negative electrode or a contact of the positive electrode tab and/or the negative electrode tab with the casing or the like is detected, the planar shape of the one end of the positive electrode tab and/or the negative electrode tab of the lithium-ion secondary battery in which the defect was detected may be identified to determine the production process line that manufactured this particular battery.

As a result, traceability will be improved.

EMBODIMENTS FOR CARRYING OUT THE INVENTION

An embodiment of the present invention will now be described in detail referring to the drawings. The same or corresponding parts are labeled with the same numerals throughout the drawings, and their description will not be repeated.

The present invention is suitably employed in any of the known lithium-ion secondary batteries, i.e. rectangular batteries, cylindrical batteries and laminated batteries.

Figure 1:
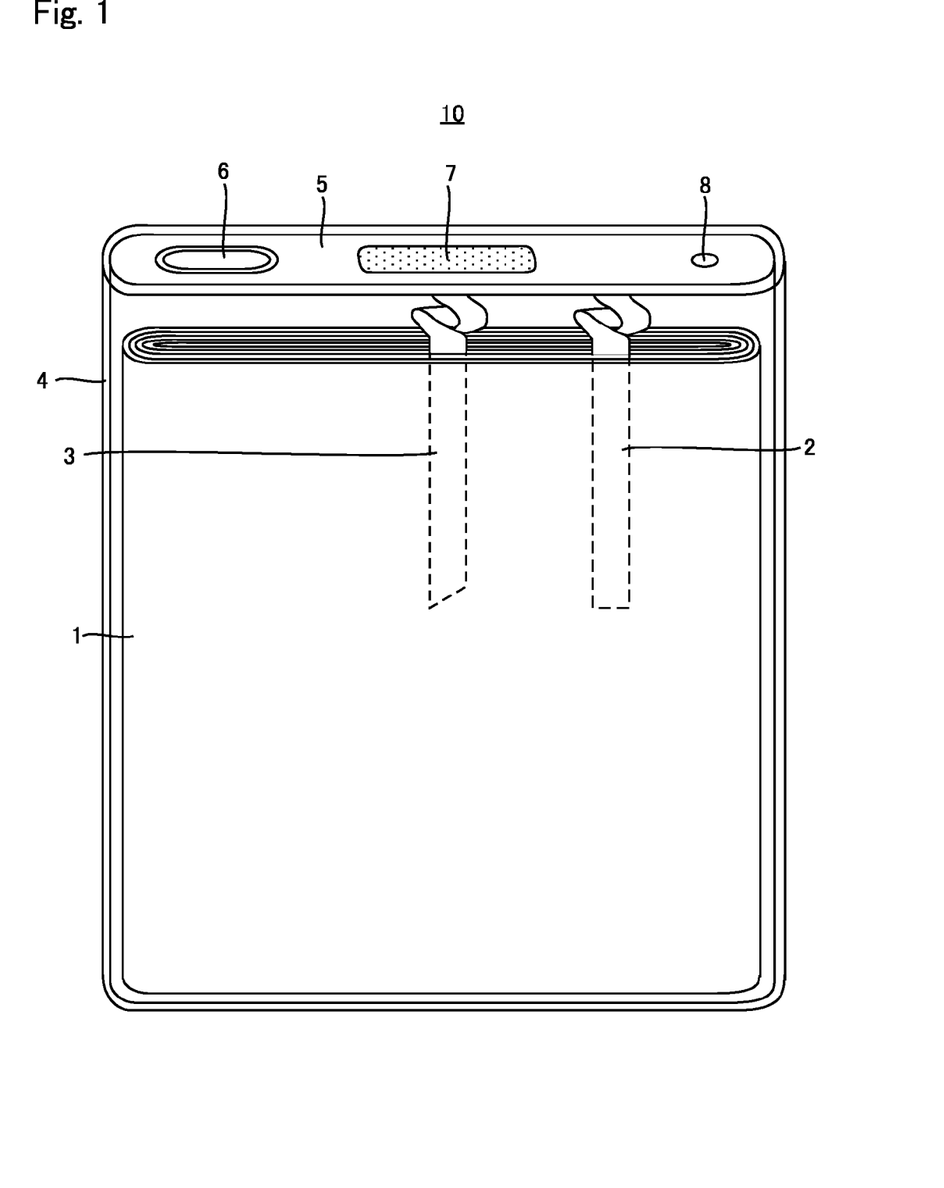
FIG. 1 is a perspective view of a lithium-ion secondary battery according to an embodiment of the present invention.

FIG. 1 is a perspective view of a lithium-ion secondary battery according to an embodiment of the present invention. In FIG. 1, the casing 4 is shown with its interior being visible.

Referring to FIG. 1, a lithium-ion secondary battery 10 according to the embodiment of the present invention is a rectangular battery including: a jelly roll 1, a positive electrode tab 2, a negative electrode tab 3, a casing 4, a lid 5, a vent 6, a terminal 7, and a fill port 8.

The jelly roll 1 is made by rolling the positive and negative electrodes with an interposed separator in between. After the positive electrode, the negative electrode and the separator are rolled, the jelly roll 1 is pressed to form a flattened shape, and is contained in the casing 4. The jelly roll 1 also contains electrolyte.

The positive electrode tab 2 is made of a conductive material such as a metal that has a nobler potential than lithium and is stable or a carbonaceous material. The positive electrode tab 2 is typically made of aluminum (Al) or an aluminum alloy, and is rectangle-shaped. Alternatively, the positive electrode tab 2 may be made of a clad material of aluminum and another metal (for example, nickel which has good weldability). The positive electrode tab 2 has one end connected to the positive electrode of the jelly roll 1 and the other end connected to the lid 5. In this case, the positive electrode tab 2 is bent between the jelly roll 1 and the lid 5, and is disposed inside the casing 4.

The negative electrode tab 3 is made of a material that has a baser potential than lithium and is stable, and, similar to the positive electrode tab 2, is rectangle-shaped. The negative electrode tab 3 is preferably made of a material that has a higher X-ray absorption capacity than the casing 4, as discussed below. If the negative electrode tab 3 is made of a material that has a higher X-ray absorption capacity than the casing 4, improved contrast between the negative electrode tab 3 and the casing 4 is achieved. It is desirable because it allows the use of a transmission X-ray inspection apparatus capable of observing the interior of the battery in a simple manner as an X-ray inspection apparatus for testing the interior of a battery in a nondestructive manner. Such a material may be, for example, copper, a copper alloy, nickel, or a clad material of copper and another metal such as nickel.

The amount of X-ray absorbed by a metal increases as the true density of the metal increases, and decreases as the true density of the metal decreases. Accordingly, "high X-ray absorption capacity" means that a metal has a high true density.

The true densities of copper, a copper alloy and nickel which form the negative electrode tab 3 are 8.9, 8.5 to 9.5 and 8.9 $g/cm^3$, respectively while the true density of aluminum which forms the casing 4 is 2.7 $g/cm^3$. Thus, as discussed above, the negative electrode tab 3 is made of a material that has a higher X-ray absorption capacity than the casing 4.

The negative electrode tab 3 has one end connected to the negative electrode of the jelly roll 1, and the other end connected to the terminal 7. In this case, the negative electrode tab 3 is folded between the jelly roll 1 and the terminal 7 and is disposed inside the casing 4.

The one end of the negative electrode tab 3 connected to the negative electrode of the jelly roll 1 has a shape with a cut at a desired angle. The shape has a geometry having at least two angles of the present invention, which has an angle on each of the left and right edge in the width direction of the one end of the negative electrode tab 3. The negative electrode tab 3 is made of a material having a higher X-ray absorption capacity than the casing 4, such that the interior of the battery can be observed in a nondestructive manner by a transmission X-ray inspection apparatus, thereby enabling recognizing the at least two angles of the negative electrode tab 3. Further, if the one end of the negative electrode tab 3 connected to the negative electrode of the jelly roll 1 is cut at varying angles in the range of plus or minus 0 to 60 degrees, for example, the cut angle chosen can also be recognized.

The object of the present invention can be achieved if the one end of the negative electrode tab 3 contained in the casing 4 is observed by an X-ray inspection apparatus in a nondestructive manner and the geometry thereof and the cut angle of the tab is recognized. Thus, the portion of the one end of the negative electrode tab 3 having the desired geometry or the cut angle (or its surrounding portions) may also be made of a material with a higher X-ray absorption capacity than the casing 4.

The casing 4 is made of a metal material such as aluminum, an aluminum alloy and iron covered with nickel, or a resin material such as polypropylene. Typically, the casing 4 is made of a metal material to ensure a mechanical strength equal to or more than a certain mechanical strength or to allow the battery to also serve as a medium to supply electric power to the outside of the battery.

If the negative electrode tab 3 is made of copper or a copper alloy or a clad material of copper and another metal such as nickel, the casing 4 is preferably made of a material having a lower X-ray absorption capacity than the material of the negative electrode tab 3, for example aluminum (including an alloy). If the entire surface of the negative electrode tab 3 or at least the portion of the one end having a cut angle (or its surrounding portions) is covered with, for example, gold or platinum, the casing 4 may be made of a metal material such as iron covered with nickel. The casing 4 then contains the jelly roll 1, the positive electrode tab 2 and the negative electrode tab 3.

If, for example, the casing 4 is made of aluminum, the lid 5 is made of aluminum. The lid 5 is then welded by laser or the like and is fitted with the opening edge of the casing 4.

The vent 6 is provided on the lid 5. If the internal pressure increases due to gases generated in the casing 4, the vent 6 cleaves up to release the pressure. The terminal 7 is provided on the lid 5 through an insulator (not shown) and is connected to the other end of the negative electrode tab 3. The fill port 8 is provided on the lid 5. The fill port 8 is an opening through which electrolyte is injected into the jelly roll 1. After electrolyte is injected, a pin (not shown) is fitted with the fill port 8 to close it, and is welded by laser or the like to tightly seal the battery.

The positive electrode is made of a positive current collector and a positive electrode active material layer. The positive current collector is made of an Al foil, for example, and is shaped as a strip.

The positive electrode active material layer is formed on one or both sides of the positive current collector. More specifically, the positive electrode active material layer is formed by, for example, applying a slurry including a mixture of a positive electrode active material and a binder to both sides of the positive current collector, then drying the applied slurry and then pressing it in the thickness direction. The slurry is applied by, for example, a doctor blade method and a spray method. The slurry may further contain a conductive material, where necessary.

The positive electrode active material is made of, for example, any one of $LiCoO_2$, $LiNiO_2$, $LiMn_2O_4$, $LiNi_{1/3}Co_{1/3}Mn_{1/3}O_2$, and $LiFePO_4$.

The binder is made of, for example, a fluorinated resin such as polytetrafluoroethylene (PTFE) and polyvinylidene fluoride (PVDF), a rubber resin such as a styrene-butadiene rubber (SBR) and ethylene-propylene-diene multiblock polymer, and a cellulosic resin such as carboxymethylcellulose (CMC).

The conductive material is made of a carbon material such as acetylene black (AB), Ketjen black (KB), graphite and amorphous carbon. Only one of these conductive materials may be used or some of them may be mixed together.

The negative electrode is made of a negative current collector and a negative electrode active material layer. The negative current collector is made of, for example, a Cu foil and is strip-shaped.

The negative electrode active material layer is formed on one or both sides of the negative current collector. More specifically, the negative electrode active material layer is formed by, for example, applying a slurry including a mixture of a negative electrode active material and a binder to both sides of the negative current collector, then drying the applied slurry and then pressing it in the thickness direction. The slurry is applied by, for example, a doctor blade method and a spray method, mentioned above. The slurry may further contain a conductive material, where necessary.

The negative electrode active material is made of, for example, a metal that can be alloyed with Li, such as Sn and Si, metallic lithium, an LiAl alloy, amorphous carbon, artificial graphite, natural graphite, fullerene and a carbonaceous material that can occlude and discharge lithium (Li) such as a nanotube, and lithium titanate which can occlude and discharge Li such as $Li_4Ti_5O_{12}$ and $Li_2Ti_3O_7$.

The binder is made of, for example, any one of PTFE, PVDF, SBR, and carboxymethylcellulose (CMC). Only one of these binders may be used or some of them may be mixed together.

The conductive material is made of a carbon material such as AB, KB and amorphous carbon. Only one of these conductive materials may be used or some of them may be mixed together.

There is no particular limitation to the types of separator, and any known separator may be used. For example, a microporous polyethylene film or a microporous polypropylene film or a combined polyethylene-polypropylene film with a thickness of 5 to 30 μm and an aperture ratio of 30 to 70% may be suitably used as a separator. Further, to improve the pierce resistance or the heat/contraction resistance of such a separator or for other purposes, a microporous film covered or laminated, on one or both sides, with a heat resistant inorganic filler with high strength such as alumina, silica, and boehmite and a heat resistant resin such as imide and aramid may be used as a separator.

The electrolyte is made of, for example, an Li salt dissolved in an organic solvent. Li salts include those that can be disaggregated in an organic solvent to generate Li+ ions and do not have a side reaction such as disintegration in the voltage range of the battery including the electrolyte.

The Li salt is made of, for example, inorganic compounds such as $LiPF_6$, $LiBF_4$, $LiAsF_6$, and $LiClO_4$ and organic compounds such as $LiN(SO_2CF_3)_2$, $LiN(SO_2C_2F_5)_2$, $LiN(SO_2CF_3)(SO_2C_4F_9)$, $LiC(SO_2CF_2)_3$, $LiC(SO_2C_2F_5)_3$, $LiPF_{6-n}(C_2F_5)_n$ (n is an integer of 1 to 6), $LiSO_3CF_3$, $LiSO_3C_2F_5$ and $LiSO_3C_4F_8$.

Any organic solvent may be used that can dissolve an Li salt and does not have a side reaction such as disintegration in the voltage range of the battery. Organic solvents include, for example, cyclic carbonates such as ethylene carbonate, propylene carbonate, butylene carbonate, and vinylene carbonate, chain carbonates such as dimethyl carbonate, diethyl carbonate and ethyl methyl carbonate, cyclic esters such as γ-butyrolactone, chain ethers such as dimethoxyethane, diglyme, triglyme and tetraglyme, cyclic ethers such as dioxane, tetrahydrofuran, and 2-methyltetrahydrofuran, and nitriles such as acetonitrile, propionitrile, methoxypropionitrile and ethoxypropionitrile. Only one of these organic solvents may be used or some of them may be mixed together.

Of these, a preferable organic solvent is a mixed solvent of ethylene carbonate and a chain carbonate. Such a mixed solvent will provide a high conductivity and achieve good battery properties.

The electrolyte may also contain additives such as vinylene carbonates, 1,3-propane sultone, diphenyl disulfide, cyclohexylbenzene, biphenyl, fluorobenzene, and t-butylbenzene, where appropriate, to improve properties such as safety, cyclability, and high temperature storage performance.

Instead of an organic solvent, the electrolyte may contain an ambient temperature molten salt such as ethyl-methylimidazolium trifluoromethylsulfonium imide, heptyl-trimethylammonium trifluoromethylsulfonium imide, pyridinium trifluoromethylsulfonium imide, and guanidium trifluoromethyl sulfonium imide.

Further, the electrolyte may be gelated by one of the following host polymers. Host polymers include: polyvinylidene fluoride, vinylidene fluoride-hexafluoropropylene copolymer, polyacrylonitrile, polyethylene oxide, polypropylene oxide, ethylene oxide-propylene oxide copolymer, a cross-linked polymer containing an ethylene oxide chain as a main chain or a side chain, a (meth)acrylate copolymer that can be cross-linked by light or heat and has an oxetane compound or alicyclic epoxy compound as a side chain.

Figure 2:
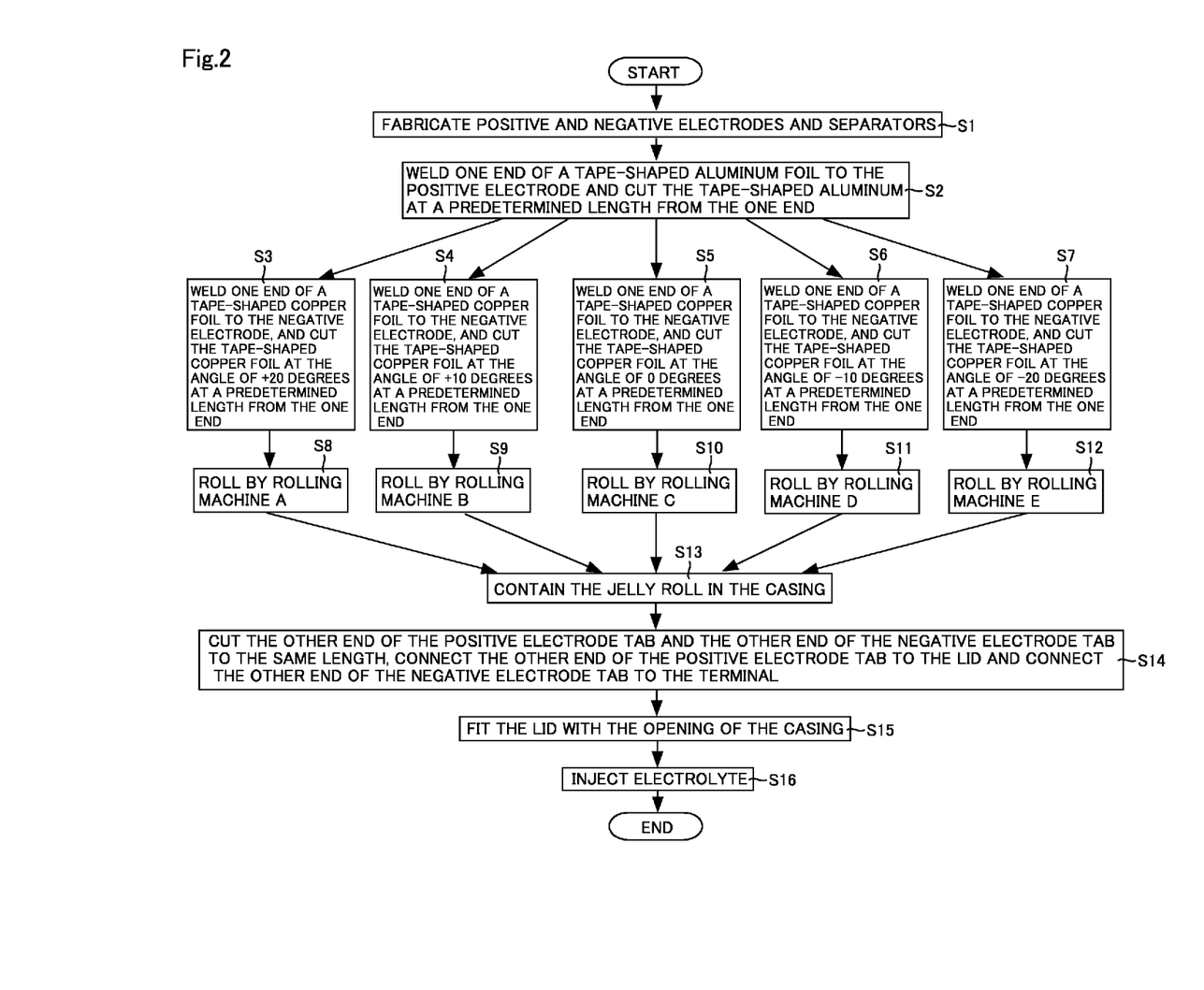
FIG. 2 is a process flowchart illustrating a manufacturing method for a lithium-ion secondary battery according to the embodiment of the present invention.
Figure 3:
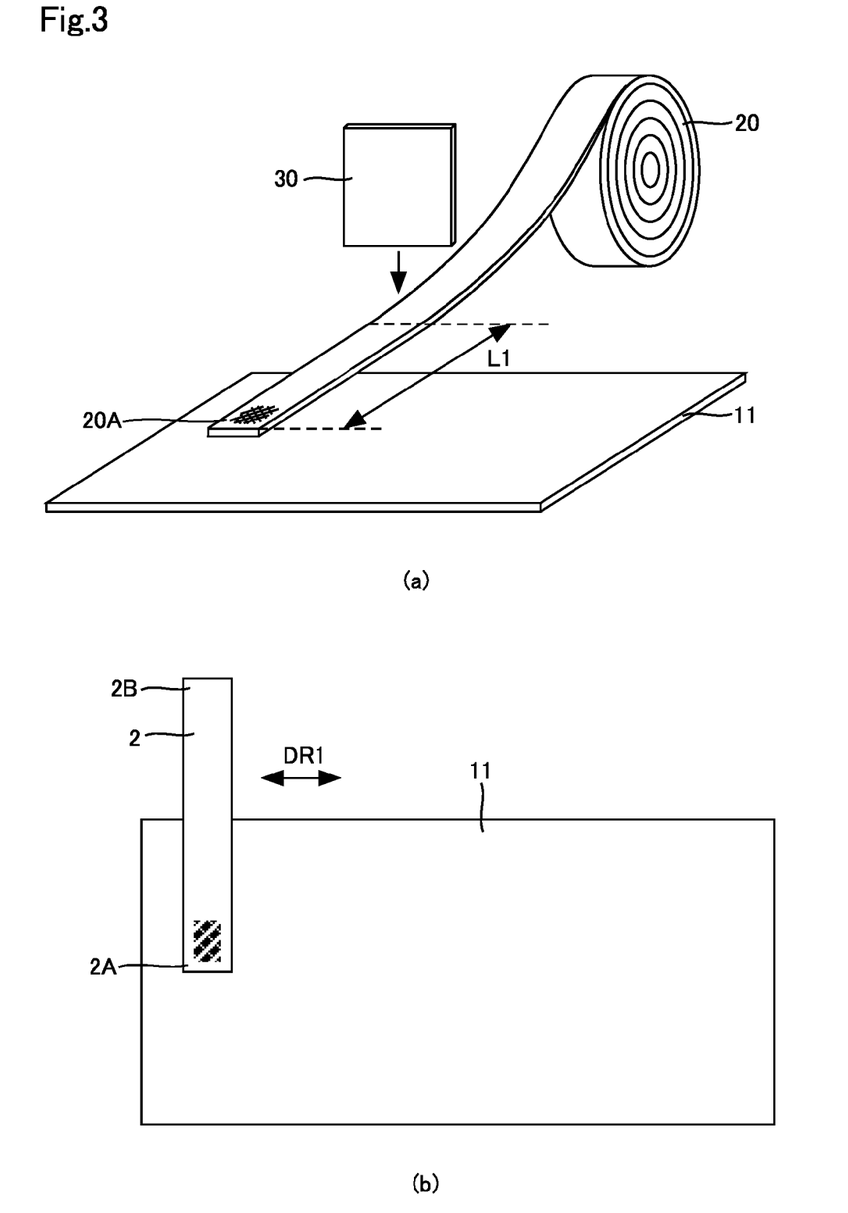
FIG. 3 schematically illustrates the process of step S2 shown in FIG. 2.
Figure 4:
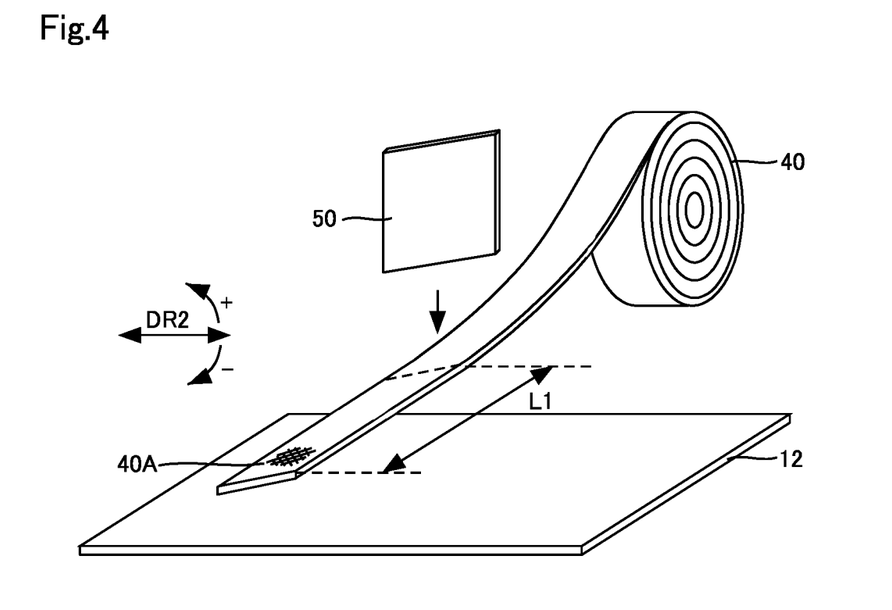
FIG. 4 schematically illustrates the processes of steps S3 to S7 shown in FIG. 2
Figure 5:
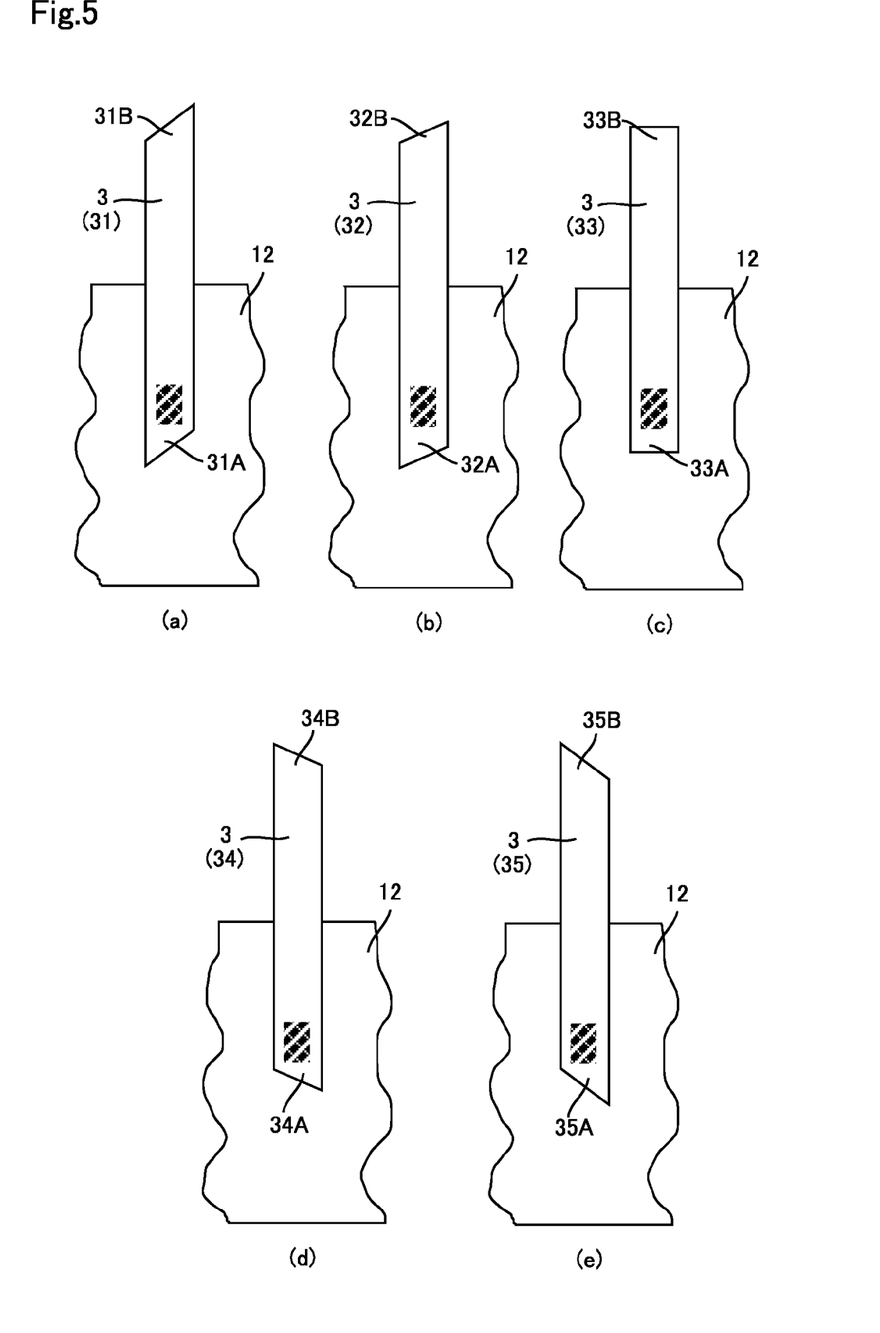
FIG. 5 schematically illustrates the processes of steps S3 to S7 shown in FIG. 2.
Figure 6:
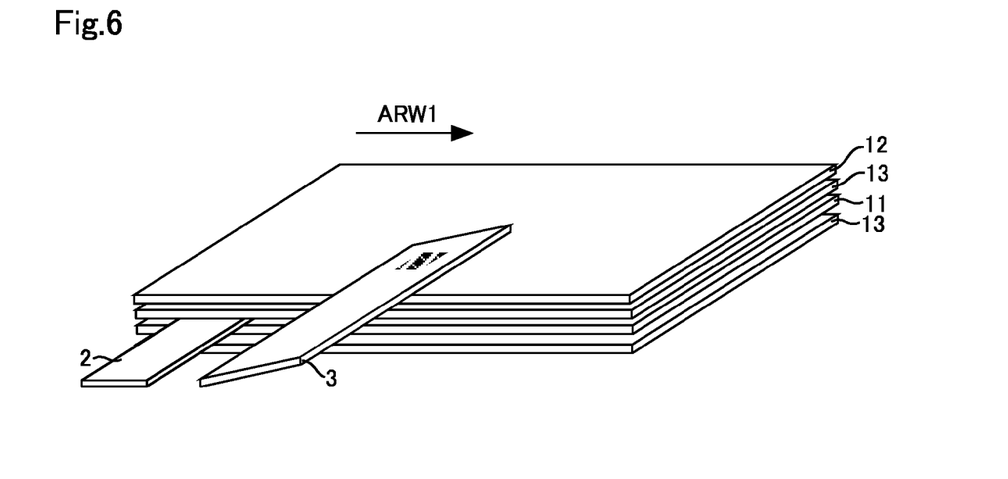
FIG. 6 schematically illustrates the processes of steps S8 to S12 shown in FIG. 2.
Figure 7:
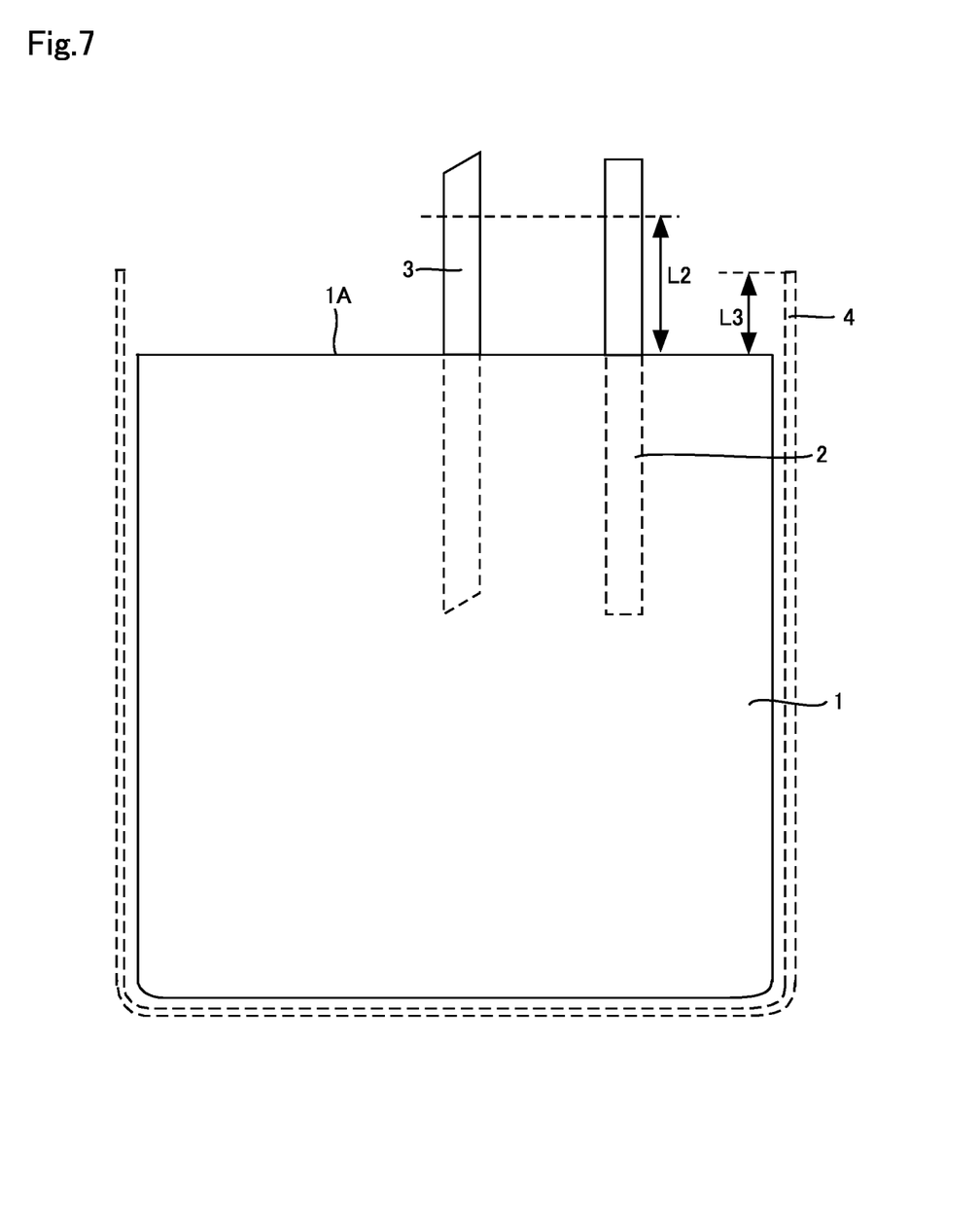
FIG. 7 schematically illustrates the process of step S14 shown in FIG. 2.
Figure 8:
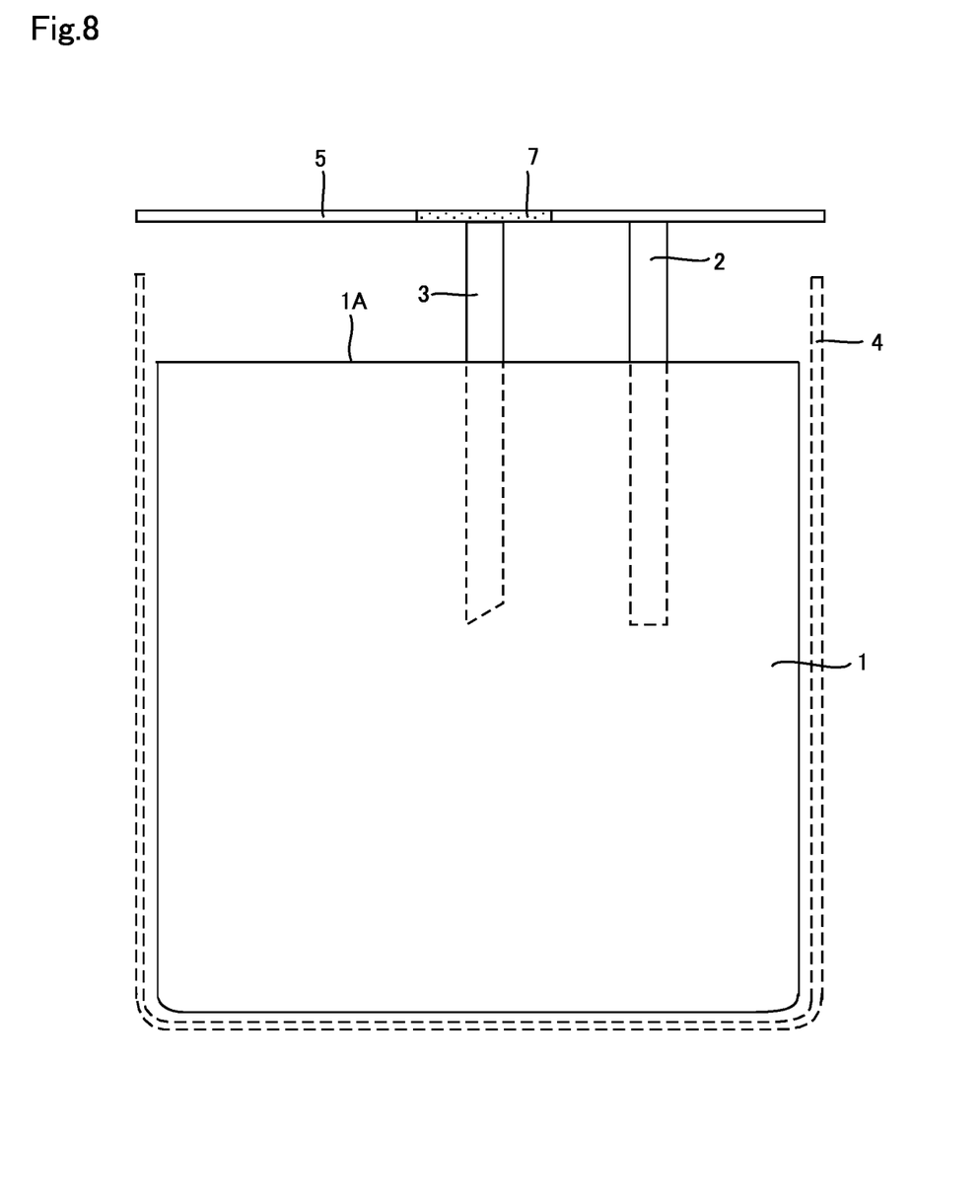
FIG. 8 schematically illustrates the process of step S14 shown in FIG. 2.

FIG. 2 is a process flowchart illustrating a manufacturing method for a lithium-ion secondary battery 10 according to the embodiment of the present invention. FIG. 2 shows a method of manufacturing lithium-ion secondary batteries 10 when five rolling machines A to E produce jelly rolls 1. FIG. 3 schematically illustrates the process of step S2 shown in FIG. 2. FIGS. 4 and 5 schematically illustrate the processes of steps S3 to S7 shown in FIG. 2. FIG. 6 schematically illustrates the processes of steps S8 to S12 shown in FIG. 2. FIGS. 7 and 8 schematically illustrate the process of step S14 shown in FIG. 2.

Referring to FIG. 2, after the manufacture of a lithium-ion secondary battery 10 is initiated, a plurality of positive electrodes and a plurality of negative electrodes are fabricated in the method described above and a plurality of separators are fabricated (step S1). Then, one end 20A of a tape-shaped aluminum foil 20 is welded to the positive electrode 11 using a welder, and the tape-shaped aluminum foil 20 is cut by cutter 30 at a predetermined length L1 from the one end 20A (step S2, see (a) of FIG. 3). Thus, the positive electrode tab 2 is connected to the positive electrode 11. In this case, the positive electrode tab 2 is connected to the positive electrode 11 at one end in the longitudinal direction of the positive electrode 11, for example. One end 2A and the other end 2B of the positive electrode tab 2 have a shape resulting from a cut of the positive electrode tab 2 in the width direction DR1 of the positive electrode tab 2 (see (b) of FIG. 3). The process of step S2 is repeated until a positive electrode tab 2 is connected to every one of the plurality of positive electrodes 11 fabricated at step S1.

Thereafter, one end 40A of the tape-shaped copper foil 40 is welded to a negative electrode 12 using a welder, and the tape-shaped copper foil 40 is cut by a cutter 50 at the cut angle of +20 degrees at the predetermined length L1 from the one end 40A (step S3, see FIG. 4). Thus, a negative electrode tab 3 (31) having one end 31A and the other end 31B resulting from a cut at the cut angle of +20 degrees is connected to the negative electrode 12 (see (a) of FIG. 5).

Further, one end 40A of the tape-shaped copper foil 40 is welded to a negative electrode 12 using a welder, and the tape-shaped copper foil 40 is cut by a cutter 50 at the cut angle of +10 degrees at the predetermined length L1 from the one end 40A (step S4, see FIG. 4). Thus, a negative electrode tab 3 (32) having one end 32A and the other end 32B resulting from a cut at the cut angle of +10 degrees is connected to the negative electrode 12 (see (b) of FIG. 5).

Furthermore, one end 40A of the tape-shaped copper foil 40 is welded to a negative electrode 12 using a welder, and the tape-shaped copper foil 40 is cut by a cutter 50 at the cut angle of 0 degrees at the predetermined length L1 from the one end 40A (step S5, see FIG. 4). Thus, a negative electrode tab 3 (33) having one end 33A and the other end 33B resulting from a cut at the cut angle of 0 degrees is connected to the negative electrode 12 (see (c) of FIG. 5).

Furthermore, one end 40A of the tape-shaped copper foil 40 is welded to a negative electrode 12 using a welder, and the tape-shaped copper foil 40 is cut by a cutter 50 at the cut angle of −10 degrees at the predetermined length L1 from the one end 40A (step S6, see FIG. 4). Thus, a negative electrode tab 3 (34) having one end 34A and the other end 34B resulting from a cut at the cut angle of −10 degrees is connected to the negative electrode 12 (see (d) of FIG. 5).

Furthermore, one end 40A of the tape-shaped copper foil 40 is welded to a negative electrode 12 using a welder, and the tape-shaped copper foil 40 is cut by a cutter 50 at the cut angle of −20 degrees at the predetermined length L1 from the one end 40A (step S7, see FIG. 4). Thus, a negative electrode tab 3 (35) having one end 35A and the other end 35B resulting from a cut at the cut angle of −20 degrees is connected to the negative electrode 12 (see (e) of FIG. 5).

In this case, a negative electrode tab 3 (31 to 35) is connected to the general center of a negative electrode 12 in the longitudinal direction of the negative electrode 12, for example.

The cut angles of +20, +10, 0, −10 and −20 degrees are determined supposing that the width direction DR2 of the tape-shaped copper foil 40 is 0 degrees and counterclockwise angles are positive (+) and clockwise ones are negative (−) (see FIG. 4). The cut angles of +20, +10, 0, −10 and −20 degrees correspond to the rolling machines A to E, respectively.

Further, steps S3 to S7 are performed concurrently. Specifically, the plurality of negative electrodes 12 fabricated at step S1 are divided into five production process lines and steps S3, S4, S5, S6 and S7 are performed.

Thus, performing steps S3 to S7 concurrently results in negative electrode tabs 3, each having one end and the other end resulting from a cut at different cut angles, connected to negative electrodes 12.

Subsequently, a positive electrode 11 with a positive electrode tab 2, a separator 13 and the negative electrode 12 with the negative electrode tab 3 (31) fabricated at step S3 are stacked upon one another and the stack is rolled by the rolling machine A in the direction of arrow ARW1 (step S8, see FIG. 6). Further, a positive electrode 11 with a positive electrode tab 2, a separator 13 and the negative electrode 12 with the negative electrode tab 3 (32) fabricated at step S4 are stacked upon one another and the stack is rolled by the rolling machine B in the direction of arrow ARW1 (step S9, see FIG. 6). Furthermore, a positive electrode 11 with a positive electrode tab 2, a separator 13 and the negative electrode 12 with the negative electrode tab 3 (33) fabricated at step S5 are stacked upon one another and the stack is rolled by the rolling machine C in the direction of arrow ARW1 (step S10, see FIG. 6). Furthermore, a positive electrode 11 with a positive electrode tab 2, a separator 13 and the negative electrode 12 with the negative electrode tab 3 (34) fabricated at step S6 are stacked upon one another and the stack is rolled by the rolling machine D in the direction of arrow ARW1 (step S11, see FIG. 6). Further, a positive electrode 11 with a positive electrode tab 2, a separator 13 and the negative electrode 12 with the negative electrode tab 3 (35) fabricated at step S7 are stacked upon one another and the stack is rolled by the rolling machine E in the direction of arrow ARW1 (step S12, see FIG. 6).

Similar to steps S3 to S7, steps S8 to S12 are performed concurrently. Specifically, Steps S3 and S8 form one production process line (i.e. a first production process line), and, similarly, steps S4 and S9 form a second production process line, steps S5 and S10 form a third production process line, steps S6 and Sll form a fourth production process line, and the steps S7 and S12 form a fifth production process line.

Then, each of the jelly rolls 1 fabricated by the first to fifth production process lines is contained in a casing 4 (step S13).

Thereafter, the other end of each of the positive electrode tab 2 and the negative electrode tab 3 connected to the positive electrode 11 and the negative electrode 12, respectively, of the jelly roll 1 contained in a casing 4 is cut to the same length, the other end of the positive electrode tab 2 is connected to the lid 5, and the other end of the negative electrode tab 3 is connected to the terminal 7 (step S14). In this case, the other end of the positive electrode tab 2 is cut along the width direction of the positive electrode tab 2, while the other end of the negative electrode tab 3 is cut along the width direction of the negative electrode tab 3. Accordingly, the other end of the positive electrode tab 2 and the other end of the negative electrode tab 3 have the same shape. Further, the other end of the positive electrode tab 2 and the other end of the negative electrode tab 3 are cut such that the positive electrode tab 2 and the negative electrode tab 3 have the same length. More specifically, the other end of the positive electrode tab 2 and the other end of the negative electrode tab 3 are cut such that the length L2 from the end face 1A of the jelly roll 1 is larger than the distance L3 between the end face 1A of the jelly roll 1 and the opening of the casing 4 (see FIG. 7). Then, the other end of the positive electrode tab 2 after the cut is connected to the lid 5, while the other end of the negative electrode tab 3 after the cut is connected to the terminal 7 (see FIG. 8).

Then, the lid 5 is fitted with the opening of the casing 4 (step S15). In this case, the portion of the positive electrode tab 2 between the jelly roll 1 and the lid 5 is bent so as not to be in contact with the inner wall of the casing 4. The same occurs with the negative electrode tab 3. Thereafter, electrolyte is injected into the jelly roll 1 through the fill port 8 (step S16). Thus, the lithium-ion secondary battery 10 is completed.

It should be noted that steps S13 to S16 are performed on all of the plurality of jelly rolls 1 fabricated at steps S8 to S12.

In FIG. 2, the processes of steps S3 to S7 are combined with the processes of steps S8 to S12 to form the first to fifth production process lines; however, preceding and subsequent steps S1 and S2 and steps S13 to S16 may be included in the first to fifth production process lines to occur concurrently in order to ensure a certain production amount or ensure higher traceability or for other purposes.

As discussed above, a jelly roll having a negative electrode tab 3 (31) including the one end 31A having a planar shape with a cut at the angle of +20 degrees from the copper foil 40 is fabricated by the first production process line (see steps S3 and S8), a jelly roll having a negative electrode tab 3 (32) including the one end 32A having a planar shape with a cut at the angle of +10 degrees from the copper foil 40 is fabricated by the second production process line (see steps S4 and S9), a jelly roll having a negative electrode tab 3 (33) including the one end 33A having a planar shape with a cut at the angle of 0 degrees from the copper foil 40 is fabricated by the third production process line (see steps S5 and S10), a jelly roll having a negative electrode tab 3 (34) including the one end 34A having a planar shape with a cut at the angle of -10 degrees from the copper foil 40 is fabricated by the fourth production process line (see steps S6 and S11), and a jelly roll having a negative electrode tab 3 (35) including the one end 35A having a planar shape with a cut at the angle of −20 degrees from the copper foil 40 is fabricated by the fifth production process line (see steps S7 and S12). Thus, the one end 31A to 35A of each of the negative electrode tabs 3 (31 to 35) has a planar shape determined in accordance with the corresponding one of the first to fifth production process lines and having a differing dimension in the longitudinal direction of the negative electrode tab 3 or a planar shape having a constant dimension in the longitudinal direction of the negative electrode tab 3 (see (a) to (e) of FIG. 5).

As a result, if the planar shape of the one end 31A to 35A (the end welded to the negative electrode) of the negative electrode tab 3 (31 to 35) of the completed lithium-ion secondary battery 10 is recognized, it can be determined which of the first to fifth production process lines fabricated the battery.

Since the negative electrode tab 3 (31 to 35) is made of copper or the like which has a higher X-ray absorption capacity than the casing 4, the planar shape of the one end 31A to 35A of the negative electrode tab 3 (31 to 35) can be recognized by performing an X-ray inspection, where an X-ray is directed to the lithium-ion secondary battery 10 in the thickness direction of the lithium-ion secondary battery 10 and the X-ray that has passed the lithium-ion secondary battery 10 is used to observe the interior of the lithium-ion secondary battery 10. According to Patent Document 1, a projection, an aperture and the like are formed in the positive electrode tab or the like as an identifier, however, it may be difficult to recognize the identifier using an X-ray if the positive electrode tab or the like is made of the same material as the can.

Further, with the conventional number of steps for manufacturing a lithium-ion secondary battery unchanged, just changing the cut angle for cutting the tape-shaped copper foil 40 which is to form a negative electrode tab 3 allows the shape of the one end 31A to 35A of the negative electrode tab 3 (31 to 35) to be the planar shape determined in accordance with the corresponding one of the first to fifth production process lines. Accordingly, without increasing the number of steps for manufacturing a lithium-ion secondary battery, the planar shape of the one end 31A to 35A of the negative electrode tab 3 (31 to 35) can be changed to enable determining the production process line that fabricated the battery.

That is, while according to Patent Document 1, the step of providing an identifier on the positive electrode tab or the like and/or the negative electrode tab or the like must be added after the positive electrode tab is welded to the positive electrode and the negative electrode tab is welded to the negative electrode, the embodiment of the present invention does not require the step of providing an identifier, as in Patent Document 1, and only requires the angle in the planar shape of the one end 31A to 35A of the negative electrode tab 3 (31 to 35) to be changed during the conventional step of cutting the copper foil 40 in accordance with the production process line.

Figure 9:
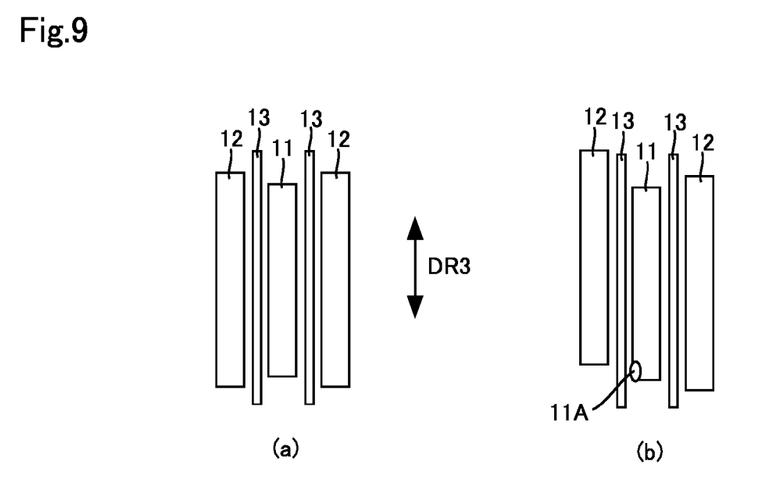
FIG. 9 shows cross sectional views of jelly rolls in the longitudinal direction.
Figure 10:
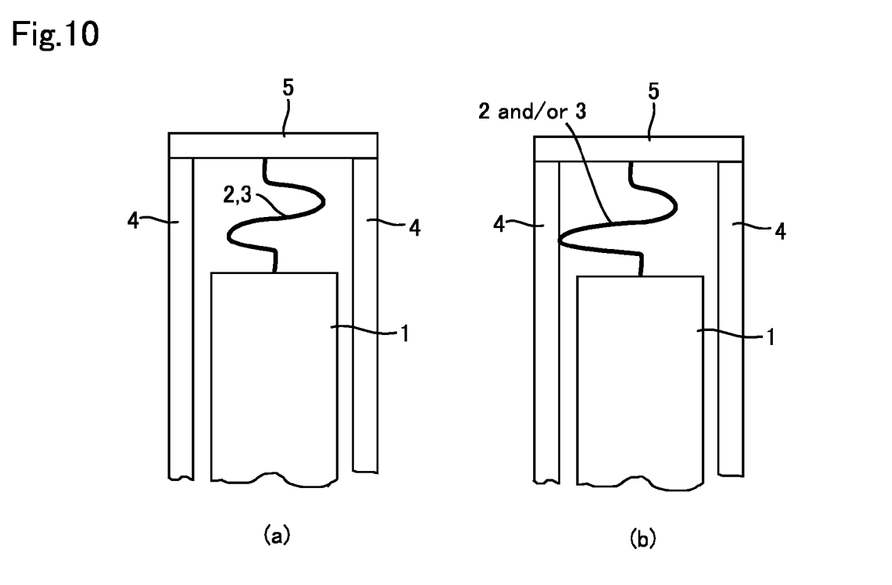
FIG. 10 shows side views of portions of lithium-ion secondary batteries.

FIG. 9 shows cross sectional views of jelly rolls 1 in the longitudinal direction. FIG. 10 shows side views of portions of lithium-ion secondary batteries 10. Referring to FIG. 9, the negative electrode 12 protrudes by 0.5 mm relative to the positive electrode 11 at both ends in the width direction DR3, and protrudes by about 2 mm relative to the positive electrode 11 at both ends in the longitudinal direction (i.e. the direction perpendicular to the paper in FIG. 9). That is, the negative electrode 12 is wider than the positive electrode 11 by 1 mm in the width direction DR3 and longer than the positive electrode 11 by 4 mm in the longitudinal direction.

In a good jelly roll 1, the positive electrode 11 is disposed inside the negative electrode 12 in its width direction DR3 (see (a) of FIG. 9).

On the other hand, in a bad jelly roll 1, the positive electrode 11 is not disposed inside the negative electrode 12 in its width direction DR3 (see (b) of FIG. 9). As a result, lithium is accumulated in a portion 11A of the positive electrode 11, which may cause fire.

A problem with the arrangement of the positive electrode 11 and the negative electrode 12 is often caused by improper rolling by the rolling machine. Thus, an X-ray inspection apparatus may be used to determine the arrangement of the positive electrode 11 and the negative electrode 12 and the cut angle of the one end of the negative electrode tab 3 in the jelly roll 1 and, if a problem with the arrangement is detected, it can be determined that the problematic arrangement of the positive electrode 11 and the negative electrode 12 is attributable to improper rolling by the rolling machine A in the first production process line if the cut angle of the one end of the negative electrode tab 3 is +20 degrees. A similar process occurs if the cut angle determined is other than +20 degrees.

Referring to FIG. 10, when the lid 5 is fitted with the opening of the casing 4, the positive electrode tab 2 and the negative electrode tab 3 are folded between the jelly roll 1 and the lid 5. In a normal battery, the positive electrode tab 2 and the negative electrode tab 3, which are folded, are not in contact with the casing 4 (see (a) of FIG. 10).

On the other hand, in a battery with a problem, the folded positive electrode tab 2 and/or the folded negative electrode tab 3 are in contact with the casing 4 (see (b) of FIG. 10).

A contact of the positive electrode tab 2 and/or the negative electrode tab 3 with the casing 4 is also often caused by improper rolling by the rolling machine. Thus, an X-ray inspection apparatus may be used to determine whether the positive electrode tab 2 and the negative electrode tab 3 are in contact with the casing 4, as well as the cut angle of the one end of the negative electrode tab 3 in the production process line and, if a problem is detected, it is determined that the problematic arrangement of the positive electrode 11 and the negative electrode 12 is attributable to improper rolling by the rolling machine A in the fifth production process line if the cut angle of the one end of the negative electrode tab 3 is −20 degrees. A similar process occurs when the cut angle determined is other than −20 degrees.

Thus, an X-ray inspection apparatus may be used to test a battery for the above two points, for example, and, if the test result indicates a problem, the cut angle of the one end of the negative electrode tab 3 of a jelly roll 1 with a problem may be determined to determine which production process line fabricated the battery with the problem. Thus, traceability will be improved.

The result of an experiment will be described where the cut angle of the one end of a negative electrode tab 3 is determined from an X-ray picture of the one end of the negative electrode tab 3 for various cut angles for the one end of a negative electrode tab 3: 20, 10, 0, −10 and −20 degrees.

Five X-ray workers conducted such an experiment once and, as a result, all of them were able to determine the cut angles of 20, 10, 0, −10 and −20 degrees with 100 percent precision.

Next, the result of an experiment will be described where the cut angle of the one end of a negative electrode tab 3 is determined from an X-ray picture of the one end of the negative electrode tab 3 for various cut angles for the one end of a negative electrode tab 3: +10, +5, 0, −5 and −10 degrees.

Five X-ray workers conducted such an experiment once and, as a result, the percentage of questions answered correctly was about 90 percent. Therefore, if the cut angle is varied for the one end of a negative electrode tab 3, the cut angle is preferably varied by 10 degrees or larger.

When the cut angle of the one end of a negative electrode tab 3 was varied by 10 degrees to the positive or negative side such that the absolute value is 30 degrees or larger, it was found that improper welding may occur since the welding surface of the negative electrode tab 3 to the negative electrode becomes smaller as the cut angle increases to the positive or negative side. As a result of the experiment, it was determined that the preferable cut angles are up to plus or minus 60 degrees (+60, +50, +40, +30, +20, +10, 0, −10, −20, −30, −40, −50 and −60 degrees).

As discussed above, the lithium-ion secondary battery 10 includes a negative electrode tab 3 having the one end with a cut at a cut angle determined in accordance with the production process line that fabricated it. Therefore, after the lithium-ion secondary battery 10 is completed, the lithium-ion secondary battery 10 may be tested using an X-ray inspection apparatus and, if a defect in the arrangement of the positive electrode 11 and the negative electrode 12 or a contact of the positive electrode tab 2 and/or the negative electrode tab 3 with the casing 4 is detected, the cut angle of the one end of the negative electrode tab 3 of the lithium-ion secondary battery 10 with such a defect may be recognized to enable determining the production process line that fabricated the battery. As a result, traceability will be improved.

In the above description, the cut angle of the one end of the negative electrode tab 3 is varied in accordance with various production process lines. However, the embodiment of the present invention is not limited thereto, and the cut angle of the one end of the positive electrode tab 2 may be varied in accordance with various production process lines.

Further, in the embodiment of the present invention, the cut angles of both the one end of the positive electrode tab 2 and the one end of the negative electrode tab 3 may be varied in accordance with various production process lines. Generally, the cut angle of at least one of the one end of the positive electrode tab 2 and the one end of the negative electrode tab 3 may be varied in accordance with various production process lines. The one end of either the positive electrode tab 2 or the negative electrode tab 3 may be cut at varying cut angles for other purposes than association with various production process lines.

In the above description, the shape of the one end of the positive electrode tab 2 and/or the negative electrode tab 3 has at least two angles and the cut angle is varied to enable identifying the shape of the one end of the positive electrode tab 2 and/or the negative electrode tab 3. However, the embodiment of the present invention is not limited thereto and the planar shape of the one end of the positive electrode tab 2 and/or the negative electrode tab 3 may have another geometry that is varied in accordance with various production process lines.

In this case, suitably, the one end of the positive electrode tab 2 and/or the negative electrode tab 3 has a cut shape of an arc or a desired shape with three or more angles (for example, step-like, or in triangular waves). More specifically, other than a shape with two angles or an arc, shapes with three angles, four angles, or five angles may be used to ensure workability or reliability in the cutting or recognizing step, for example.

That is, according to the embodiment of the present invention, the one end of the positive electrode tab 2 and/or the negative electrode tab 3 may be in any planar shape with varied dimension in the longitudinal direction of the positive electrode tab 2 and/or the negative electrode tab 3.

Further, in the above description, batteries are fabricated by the first to five production process lines. However, the embodiment of the present invention is not limited thereto, and batteries are suitably fabricated by two or more production process lines, even six or more production process lines.

Further, in the above description, a defect in the arrangement of the positive electrode 11 and the negative electrode 12 and a contact of the positive electrode tab 2 and/or the negative electrode tab 3 with the casing 4 are detected by an X-ray inspection apparatus. However, these are merely examples of defects to be detected in the manufacturing process and the embodiment of the present invention is not limited thereto, and the present invention may be suitably employed for other tests where nondestructive testing is preferable.

In the above description, the cut angle of the one end of the negative electrode tab 3 is varied in accordance with production process lines in a rectangular lithium-ion secondary battery 10 with a rectangular casing 4 as an example. However, the embodiment of the present invention is not limited thereto and the present invention may be suitably employed in a cylindrical lithium-ion secondary battery with a cylindrical casing or a laminated lithium-ion secondary battery with a casing made of a laminated material.

In a cylindrical lithium-ion secondary battery, the casing is made of a metal material containing iron or nickel, the negative electrode tab is made of a metal material with a higher X-ray absorption capacity than iron or nickel, and the positive electrode tab is made of aluminum. Accordingly, similar to the negative electrode tab, the cut angle of the one end of the positive electrode tab may be varied in accordance with various production process lines, and the cut angle of the one end of only the positive electrode tab, instead of the negative electrode tab, may be varied in accordance with various production process lines. In this case, if the positive electrode tab is to be tested in a nondestructive manner using an X-ray inspection apparatus, it is desirable that the positive electrode tab is made of a material with a higher X-ray absorption capacity than the casing.

A typical cylindrical lithium-ion secondary battery has a cylindrical casing and, accordingly, has a jelly roll that is cylindrical in appearance. However, differences in the shape of jelly rolls do not affect implementation of the present invention.

A laminated lithium-ion secondary battery is made by rolling a positive electrode and a negative electrode with an interposed separator to form a jelly roll and seal the jelly roll with a laminated film, or by stacking a positive electrode and a negative electrode with an interposed separator and seal the stack with a laminated film Then, a positive electrode tab is welded to the positive electrode of the jelly roll or the stack, while a negative electrode tab is welded to the negative electrode of the jelly roll or the stack. In a laminated lithium-ion secondary battery, the positive electrode tab is made of aluminum or an aluminum alloy, the negative electrode is made of nickel, nickel-plated copper or a clad material of nickel and copper (i.e. a metal material that includes, at least, copper and nickel), and the laminated film is made of aluminum or a fusible resin.

If a laminated lithium-ion secondary battery includes a jelly roll, the structure of the jelly roll is generally the same as that of the jelly roll 1 described above. The method of connecting the positive electrode tab and the negative electrode tab to the positive electrode and the negative electrode as well as their positions are generally the same as in the rectangular lithium-ion secondary battery 10 described above, and the present invention may be suitably employed if the positive electrode tab and/or the negative electrode tab is made of a material with a higher X-ray absorption capacity than the casing.

If a laminated lithium-ion secondary battery includes a stack, the stack is made by stacking a positive electrode and a negative electrode with an interposed separator. A positive electrode tab is welded to a portion of the positive current collector in the positive electrode where no positive electrode active material layer is provided, while a negative electrode tab is welded to a portion of the negative current collector in the negative electrode where no negative electrode active material layer is provided. The positive electrode, the negative electrode and the separator are stacked by a stacking apparatus. Accordingly, at least one of the positive electrode tab and the negative electrode tab may be cut at a cut angle determined in accordance with the production process line that includes that stacking apparatus and, after the laminated lithium-ion secondary battery is completed, the planar shape of at least one of the positive electrode tab and the negative electrode tab may be recognized using an X-ray inspection apparatus to enable identifying the production process line that fabricated the battery. In this case, at least one of the positive electrode tab and the negative electrode tab is preferably made of a material with a higher X-ray absorption capacity than the casing (i.e. the laminated material).

In a cylindrical lithium-ion secondary battery or a laminated lithium-ion secondary battery, too, at least one of a defect in the arrangement of the positive electrode and the negative electrode and a contact of the positive electrode tab and/or the negative electrode tab with the casing may be detected using an X-ray inspection apparatus, or other tests where nondestructive testing is preferable may be performed by an X-ray inspection apparatus.

As discussed above, in a rectangular lithium-ion secondary battery, a cylindrical lithium-ion secondary battery and a laminated lithium-ion secondary battery, the one end of at least one of the positive electrode tab and the negative electrode tab has a planar shape determined in accordance with the production process line that fabricated the battery, and at least one of the positive electrode tab and the negative electrode tab is preferably made of a material with a higher X-ray absorption capacity than the casing.

However, if a rectangular lithium-ion secondary battery, a cylindrical lithium-ion secondary battery and a laminated lithium-ion secondary battery are tested in the thickness direction using X-ray CT, at least one of the positive electrode tab and the negative electrode tab does not have to be made of a material with a higher X-ray absorption capacity than the casing, and may be made of the same material as the casing. When the lithium-ion secondary battery or the like is tested in the thickness direction using X-ray CT, an image of a cross section of the battery taken when it is cut in the thickness direction is obtained, such that the planar shape of the one end of the positive electrode tab and the negative electrode tab can be recognized even when at least one of the positive electrode tab and the negative electrode tab is not made of a material with a higher X-ray absorption capacity than the casing.

Accordingly, a lithium-ion secondary battery according to an embodiment of the present invention suitably includes a casing, a power generating element contained in the casing and in which a positive electrode and a negative electrode are disposed with an interposed separator, a positive electrode tab welded to the positive electrode of the power generating element, and a negative electrode tab welded to the negative electrode of the power generating element, where one end of at least one of the positive electrode tab and the negative electrode tab has an arc-like shape or a geometry having at least two angles or a shape with a varied cut angle, and these shapes are formed by planar shapes.

The invention claimed is:

1. A method for manufacturing a lithium-ion secondary battery comprising:
   step of fabricating a positive electrode, a negative electrode and a separator;
   step of fabricating at least one of a negative electrode tab having one end with a planar shape varying in accordance with the production process lines and a positive electrode tab having one end with a planar shape varying in accordance with the production process lines;
   step of connecting the one end of the positive electrode tab to the positive electrode and connecting the one end of the negative electrode tab to the negative electrode;
   step of stacking the positive electrode with the positive electrode tab, the separator, and the negative electrode with the negative electrode tab, and rolling the stack; and
   step of inserting the rolled stack in a casing.

2. The method for manufacturing a lithium-ion secondary battery according to claim 1, wherein
   at least one of the positive electrode tab and the negative electrode tab is made of a material with a higher X-ray absorption capacity than the casing.

3. The method for manufacturing a lithium-ion secondary battery according to claim 1 or 2, wherein
   the casing is made of aluminum or an aluminum alloy, and the negative electrode tab is made of a material selected from copper, nickel, and a clad material of copper and nickel.

4. The method for manufacturing a lithium-ion secondary battery according to claim 1 or 2, wherein
the casing is made of a metal material containing iron or nickel, and
the negative electrode tab is made of a metal material with a higher X-ray absorption capacity than iron or nickel.

5. The method for manufacturing a lithium-ion secondary battery according to claim 1 or 2, wherein
the casing is made of a laminated material containing aluminum and a fusible resin, and
the negative electrode tab is made of a metal material containing at least copper or nickel.

6. The method for manufacturing a lithium-ion secondary battery according to claim 1 or 2, wherein
the planar shape is based on a width direction of the negative electrode tab and results from a straight cut of the negative electrode tab at a cut angle determined in accordance with a production process line including a plurality of production steps.

7. The method for manufacturing a lithium-ion secondary battery according to claim 6, wherein
the planar shape has any one of the angles of +60, +50, +40, +30, +20, +10, 0, −10, −20, −3 , −40, −50, and −60 degrees.

* * * * *